United States Patent Office 3,256,185
Patented June 14, 1966

3,256,185
LUBRICANT CONTAINING ACYLATED AMINE-CARBON DISULFIDE PRODUCT
William M. Le Suer, Cleveland, Ohio, assignor to The Lubrizol Corporation, Wickliffe, Ohio, a corporation of Ohio
No Drawing. Filed Nov. 2, 1964, Ser. No. 408,331
17 Claims. (Cl. 252—32.7)

This application is a continuation-in-part of co-pending application Ser. No. 116,289, filed June 12, 1961 now U.S. Patent 3,200,107 granted August 10, 1965.

This invention relates to sulfur- and nitrogen-containing compositions and in a more particular sense it relates to sulfur- and nitrogen-containing compositions adapted for use as additives in hydrocarbon oils. This invention relates also to hydrocarbon oils, especially lubricating oil compositions.

The problem of deterioration of hydrocarbon oils has been the cause of principal concern in the formulation of hydrocarbon oil compositions such as fuels and lubricating compositions. Deterioration of hydrocarbon oils results in the formation of products which are corrosive to the metal surfaces with which the oils come into contact. It results also in the formation of products which have a tendency to agglomerate to form sludge and varnish-like deposits.

In recent years it has been a common practice to incorporate into hydrocarbon oils chemical additives which are capable of inhibiting the deterioration of oil and the formation of these harmful deposits. Such additives have generally been classified into three principal groups according to the manner in which they function to improve the hydrocarbon oil. One group of such additives are the oxidation inhibitors which function to stabilize the oil against oxidative degradation. Another group of such additives are the corrosion inhibitors which counteract the corrosiveness of the products of oil degradation or passivate the metal surfaces against the corrosive action of such products. Still another group of such additives are the detergents or dispersing agents which function to maintain the products of oil degradation in dispersion in the oil phase and to prevent the deposition of sludge and varnish.

Two or more such additives are often needed in a hydrocarbon oil to stabilize the oil against formation of harmful degradation products. The incorporation in an oil, however, of several different types of additives not only is costly, but is also dependent upon the compatibility of the additives with one another. Thus, it is known that additives which are effective separately may not be used in combination because of their incompatibility. A great deal of effort has recently been devoted to the development of so-called "multi-functional" additive, i.e., an additive which, by itself, is capable of imparting several desirable properties to an oil. It will be readily appreciated that the use of such additive is highly advantageous from the standpoint of both economy and convenience.

It is, accordingly, an object of this invention to provide novel compositions of matter.

It is also an object of this invention to provide compositions adapted for use as additives in hydrocarbon oils.

It is also an object of this invention to provide compositions useful as corrosion and oxidation inhibitors in hydrocarbon oils.

It is also an object of this invention to provide compositions useful as detergents in hydrocarbon oils.

It is also an object of this invention to provide compositions useful as both detergent additives and oxidation and corrosion inhibitors in hydrocarbon oils.

It is also an object of this invention to provide improved hydrocarbon oils.

It is also an object of this invention to provide improved fuel compositions.

It is also an object of this invention to provide improved lubricating compositions.

These and other objects are attained in accordance with this invention by providing a process for preparing sulfur- and nitrogen-containing compositions which comprises reacting at a temperature above about 80° C., 1.0 mole of an alkylene amine with at least about 0.5 equivalent of carbon disulfide and at least about 1.0 equivalent of a substantially hydrocarbon-substituted dicarboxylic acid having at least about 12 aliphatic carbon atoms in the hydrocarbon radical, and removing the water formed by the reaction.

The alkylene amines useful in the above process are the polyamines conforming for the most part to the structure

$$H_2N(\text{-Alkylene-NH})_nH$$

in which $n$ is an integer preferably less than about 8. The alkylene amines include, for example, ethylene amines, propylene amines, butylene amines, trimethylene amines, tetramethylene amines, and also the cyclic homologues of such polyamines, e.g., piperazines. Specific examples of the alkylene amines are ethylene diamine, diethylene triamine, triethylene tetramine, propylene diamine, tripropylene tetramine, tetraethylene pentamine, trimethylene diamine, pentaethylene tetramine, di(trimethylene) triamine, N-2-aminoethyl-piperazine, octamethylene diamine, etc. The ethylene amines are especially useful. They are described in some detail under the heading "ethylene amines" in "Encyclopedia of Chemical Technology," Kirk and Othmer, volume 5, pages 898–905, Interscience Publishers, New York (1950). Such compounds are prepared most conveniently by the reaction of an alkylene chloride with ammonia. This reaction results in the production of somewhat complex mixtures of alkylene amines including cyclic condensation products such as piperazines and these mixtures find use in the process of this invention. On the other hand, quite satisfactory products may be obtained also by the use of pure alkylene amines. An especially useful alkylene amine for reasons of economy as well as effectiveness of the products derived therefrom is a mixture of ethylene amine prepared by the reaction of ethylene chloride and ammonia having a composition which corresponds to that of tetraethylene pentamine. This is available in the trade under the trade name "Polyamine H."

Substituted dicarboxylic acids and anhydrides are useful in preparing the sulfur- and nitrogen-containing additives of this invention. In most instances the anhydride is preferred for use because of its greater reactivity. The substantially hydrocarbon-substituted dicarboxylic acids useful herein comprise principally the substituted succinic acids and anhydrides, although other dicarboxylic acids such as substituted malonic acids, glutaric acids, adipic acids, etc., likewise are contemplated for use herein. The substantially hydrocarbon radical in such acids should contain at least about 12 aliphatic carbon atoms in order to impart sufficient oil solubility. It may also contain a polar substituent such as chloro, bromo, nitro, alkoxy, or phenoxy radical.

The substantially hydrocarbon-substituted succinic acids may be prepared by reacting maleic anhydride with an olefin or a chlorinated hydrocarbon. The reaction involves merely heating the reactants to a temperature above about 100° C. and the product is an alkenyl succinic anhydride. The alkenyl group may be hydrogenated to an alkyl group. The anhydride may be converted to the corresponding acid by treatment with water or steam. The most common sources of the hydrocarbon radicals in such acids are olefin polymers such as polyethylene, polypropene, polyisobutene, etc., having molecular weights above about 150. A particularly preferred polyolefin for this use is polyisobutene.

The use of olefin polymers having molecular weight above about 700 has been found to result in products which are especially useful for the purpose of this invention and is therefore preferred. Higher molecular weight olefin polymers, that is, those having molecular weights above about 50,000 or 100,000, have been found to impart also viscosity index improving properties to the products obtained by the process of this invention. The use of such higher molecular weight olefin polymers is in many instances desirable. Copolymers of aliphatic olefins with a small amount, i.e., less than about 5% by weight of aromatic olefins such as styrene or diolefins such as isoprene, chloroprene, butadiene likewise are contemplated for use herein. Other sources of the hydrocarbon substituent include petroleum fractions such as mineral oil, waxes, still bottoms, etc.

The reaction which characterizes the process of this invention involves the acylation of at least one nitrogen atom of the alkylene amine with an acid radical of the dicarboxylic acid. It involves also the reaction of at least 0.5 equivalent of the alkylene amine with carbon disulfide. The acylation requires a temperature of at least about 80° C. and is accompanied by the formation of one mole of water from each equivalent of the acid radical. The product of the acylation is therefore substantially non-acidic and is believed to comprise predominantly an amide or an imide and may include cyclic amide and polyamide linkages. A small amount of amine carboxylate salts and imidazolines may also be formed but these do not amount to an appreciable proportion of the product.

The exact nature of the reaction involving the amine with carbon disulfide is not known, although it appears that the stoichiometry of the reaction requires one equivalent (i.e., one-half mole) of the carbon disulfide for one equivalent of the amine. The reaction is exothermic and takes place readily upon mixing the amine with carbon disulfide. Although substantially all of the sulfur from the carbon disulfide appears in the product, one-half of this sulfur is so reactive as to be readily removed upon heating at a temperature above about 70° C. The precise structure of either product is not known, i.e., the one obtained simply by mixing the amine and carbon disulfide and the one obtained by heating such a mixture above about 70° C. Both, however, are contemplated as being within the scope of this invention.

A plausible explanation for the formation of the products of this process is found in the following equations, where R is a hydrocarbon radical and $R^1$ is an alkylene radical:

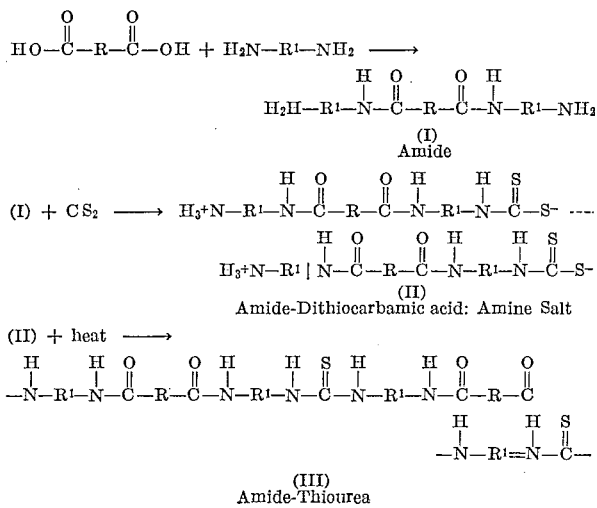

It will be noted that the overall reaction involved in the process of this invention is quite complex and that the above equations are no more than illustrative. They are based upon the stoichiometry indicated by suitable proportions of reactants. The complexity of the process is shown by the fact that the products may contain substantial proportions of imide, cyclic amide, and polyamide linkages as well as linkages other than the dithiocarbamic acid-amide or thiourea types. It will be noted also that the above equations are accurate only when the amine and acid are reacted together first, and then the carbon disulfide.

The process of this invention may be carried out by mixing the reactants in any order. All three reactants may be mixed at room temperature and heated to a temperature above about 80° C. to effect acylation. The reaction may likewise be carried out by first reacting the amine with carbon disulfide and then acylating the intermediate product with the dicarboxylic acid, or by acylating the amine with the dicarboxylic acid and then reacting the acylated amine with carbon disulfide. This last mentioned mode of carrying out the process is preferred because the products obtained have been found to be especially useful for the purpose of this invention. The preferred temperature for carrying out the acylation is between about 150° C. and 250° C.

As indicated previously the acylation is accompanied by the formation of water. The removal of the water formed can be effected by heating the reaction mixture to 100° C. or higher. It may be facilitated by blowing the reaction mixture with an inert gas such as nitrogen during such heating. It may be facilitated also by the use in the reaction mixture of an inert solvent which forms a co-distillable azeotropic mixture with water. Examples of such solvents are benzene, n-hexane, toluene, xylene, etc. The use of such solvents permits the removal of water at a substantially lower temperature, e.g., 80° C.

The relative proportions of reactants to be used in the process are based upon the stoichiometry of the reaction involved in the process and the utility of the products obtained therefrom for the purpose of this invention. The minimum amounts of the dicarboxylic acid and the carbon disulfide to be used are 1 equivalent of the dicarboxylic acid (1 mole contains 2 equivalents) and about 0.5 equivalent of the carbon sulfide (1 mole contains 2 equivalents) for each mole of the alkylene amine used. The maximum amounts of these two reactants to be used are based on the total number of equivalents of the alkylene amine used. In this respect, it will be noted that 1 mole of the alkylene amine contains as many equivalents as there are nitrogen atoms in the molecule. Thus, the maximum combined equivalents of dicarboxylic acid and carbon disulfide which can react with one mole of alkylene amine is equal to the number of nitrogen atoms in the alkylene amine molecule. If an excess of carbon disulfide or dicarboxylic acid is used, this excess will not take part in the reaction and consequently such excess has little beneficial effect. On the other hand, if the total amount of the dicarboxylic acid and the carbon disulfide used is less than the maximum amount, the products will contain un-reacted free amino nitrogen atoms. Such products have been found to be useful in this invention. It has also been found that the products having particular usefulness in this invention are those obtained by the use of dicarboxylic acid and carbon disulfide in relative amounts with the limits of ratio of equivalents from about 1:3 to about 3:1. A specific example illustrating the limits of the relative proportions of the reactants is as follows: one mole of a tetraalkylene pentamine is reacted with from 1 to 4.5 equivalents, preferably from 1 to 3 equivalents, of dicarboxylic acid and from about 0.5 to 4 equivalents, preferably from 1 to 3 equivalents, of carbon disulfide.

EXAMPLE 1

To a mixture of 1,750 grams of a mineral oil and 3,500 grams (6.5 equivalents) of a polyisobutene-substituted succinic anhydride having an acid number of 104 prepared by the reaction of maleic anhydride with a chlorinated polyisobutene having a molecular weight of 1000 and a chlorine content of 4.5% there is added at 70° C.–100° C. 946 grams (25.9 equivalents) of triethylene tetramine. The reaction is exothermic. The mixture is heated at 160°–170° C. for 12 hours while nitrogen is passed through the mixture, whereupon 59 cc. of water is collected as the distillate. The mixture is diluted with 1,165 grams of mineral oil and filtered. The filtrate is found to have a nitrogen content of 4.12%. To 6,000 grams of the above acylated product there is added 608 grams (16 equivalents) of carbon disulfide at 25°–50° C. throughout a period of 2 hours. The mixture is heated at 60°–73° C. for 3 hours and then at 68°–85° C./7 mm. Hg for 5.5 hours. The residue is filtered at 85° C. and the filtrate is found to have a nitrogen content of 4.45% and a sulfur content of 4.8%.

EXAMPLE 2

The product of Example 1 is heated at 150°–180° C. for 4.5 hours and filtered. The filtrate is found to have a nitrogen content of 3.48% and a sulfur content of 2.48%.

EXAMPLE 3

An alkylene amine mixture consisting of 34% (by weight) of a commercial ethylene amine mixture having an average composition corresponding to that of tetraethylene pentamine, e.g., 8% of diethylene triamine, and 24% of triethylene tetramine (459 grams, 11.2 equivalents) is added to 4,000 grams (7.4 equivalents) of the polyisobutene-substituted succinic anhydride for Example 1 and 2,000 grams of mineral oil at 61°–88° C. The mixture is heated at 150°–160° C. for 6 hours while being purged with nitrogen. A total of 75 cc. of water is collected as the distillate during the period. The residue is diluted with 913 grams of mineral oil, heated to 160° C. and filtered. The filtrate is found to have a nitrogen content of 2.15%. To 6,834 grams of the above filtrate there is added 133 grams (3.5 equivalents) of carbon disulfide at 22°–30° C. throughout a period of 1 hour. The mixture is heated at 50°–72° C. for 2.5 hours and then to 90° C./15 mm. The residue is found to have a nitrogen content of 2.13% and a sulfur content of 1.41%.

EXAMPLE 4

The product of Example 3 is heated at 120°–160° C. for 4 hours and filtered. The filtrate is found to have a nitrogen content of 2.14% and a sulfur content of 0.89%.

EXAMPLE 5

A mixture of 508 grams (12 equivalents) of Polyamine H and 152 grams (4 equivalents) of carbon disulfide is prepared at 25°–60° C., heated to 190° C. in 3 hours and at 190°–210° C. for 10 hours. The mixture is then purged with nitrogen at 200° C. for 1 hour. The residue is found to have a nitrogen content of 29.7% and a sulfur content of 6.5%. The above product (95 grams) is added to a solution of 1,088 grams (2 equivalents) of the polyisobutene-substituted succinic anhydride of Example 1 in 600 cc. of toluene at 70°–80° C. in 10 minutes. The mixture is heated at 127° C. for 8 hours whereupon 10.6 cc. of water is removed by azeotropic distillation with toluene. The residue is heated at 150° C. to remove toluene, diluted with 783 grams of mineral oil and heated again to 152° C./13 mm. The residue is found to have a nitrogen content of 1.48% and a sulfur content of 0.43%.

EXAMPLE 6

A mixture of 305 grams (8.5 equivalents) of triethylene tetramine, 102 grams (2.84 equivalents) of diethylene triamine, 4000 grams (7.6 equivalents) of a polyisobutene-substituted succinic anhydride having an acid number of 106, and 2000 grams of mineral oil is prepared at 60°–90° C. and heated at 124°–168° C. for 9 hours whereupon 71 cc. of water is removed as a distillate. The residue is diluted with 884 grams of mineral oil, heated to 160° C. and filtered. The filtrate has a nitrogen content 2.12%. To 1,500 grams of the filtrate there is added 60 grams (1.58 equivalents) of carbon disulfide at 28°–40° C. throughout a period of 22 minutes. The mixture is heated at 50°–60° C. for 1.25 hours and then to 70° C./3 mm. Hg. The residue is found to contain 1.95% of nitrogen and 1.84% of sulfur. The amount of the carbon disulfide entering into the reaction is about one-half of the amount used in the experiment.

EXAMPLE 7

A polyisobutene-substituted succinic anhydride having an acid number of 101 (1,200 grams, 2.16 equivalents) is hydrolyzed to the corresponding succinic acid by heating with 25 grams, (2.16 equivalents) of water at 80°–110° C. for 1 hour. To this acid there is added 223 grams (6.5 equivalents) of diethylene triamine at 70°–95° C. and 500 grams of mineral oil. The mixture is then heated to remove 47 cc. of water as the distillate, cooled to 75° C. and mixed at 102°–170° C. with 181 grams (4.76 equivalents) of carbon disulfide. The mixture is then heated at 170°–180° C. for 1 hour diluted with 800 cc. of benzene and filtered. The filtrate is heated to 120° C./50 mm. to remove benzene. The residue is found to have a nitrogen content of 2.94% and the sulfur content of 1.93%.

EXAMPLE 8

A mixture of 604 grams (14.8 equivalents) of the alkylene amine mixture of Example 3, 4,000 grams (7.4 equivalents) of the polyisobutene-substituted succinic anhydride of Example 1 and 2000 grams of mineral oil is prepared at room temperature, then heated at 150°–158° C. for 5 hours while being purged with nitrogen. A total of 70 cc. of water is collected as a distillate. The residue is diluted with 1,013 grams of mineral oil and filtered. The filtrate has a nitrogen content of 2.73%. To 5,368 grams of the filtrate there is added, throughout a period of 45 minutes, 200 grams (5.26 equivalents) of carbon disulfide at 26°–36° C. The mixture is heated at 90°–157° C. for 3.5 hours while being purged with nitrogen and filtered at 160° C. The filtrate has a sulfur content of 1.83% and a nitrogen content of 2.45%.

EXAMPLE 9

A mixture of 602 parts (by weight) of mineral oil, 800 parts (1.48 equivalents) of the polyisobutene-substituted succinic anhydride of Example 1, and 121 parts (2.95 equivalents) of the alkylene amine mixture of Example 3 is prepared at 60°–82° C., heated to 150° C. in 6 hours and blown with nitrogen at 151° C. for 5 hours. A total of 15 parts of water is collected as the distillate. To the residue there is then added 56 parts (1.47 equivalents) of carbon disulfide at 143°–150° C. throughout a period of 1 hour. The mixture is heated at 143°–150° C. for 1 hour, blown with nitrogen at 151° C. for 3 hours whereupon 25 parts of hydrogen sulfide is eliminated from the mixture. The residue is filtered, and the filtrate is found to contain 2.53% of nitrogen, 1.7% of sulfur, a base number of 14.7 at pH of 4 and an acid number of 1.2 at pH of 12.

EXAMPLE 10

The process of Example 1 is repeated except that the polyisobutene-substituted succinic anhydride is prepared from a polyisobutene having a molecular weight of 50,000.

EXAMPLE 11

The process of Example 1 is repeated except that the polyisobutene-substituted succinic anhydride is replaced (on a chemically equivalent basis) with a polypropylene (molecular weight of 1,500) substituted succinic anhydride prepared by a process similar to that described therein.

EXAMPLE 12

The process of Example 1 is repeated except that the polyisobutene-substituted succinic anhydride is replaced (on a chemically equivalent basis) with a polyisobutene-substituted glutaric acid prepared by reacting dimethyl alpha-bromoglutarate with zinc and a brominated polyisobutene having a molecular weight of 1,500 and one atom of bromine per molecule and hydrolyzing the resulting substituted ester to the corresponding glutaric acid.

EXAMPLE 13

The process of Example 5 is repeated except that Polyamine H is replaced (on a chemically equivalent basis) with hexamethylene diamine.

EXAMPLE 14

The process of Example 5 is repeated except that the Polyamine H is replaced (on a chemically equivalent basis) with di-propylene triamine.

EXAMPLE 15

The process of Example 5 is repeated except that the Polyamine H is replaced (on a chemically equivalent basis) with di-trimethylene triamine.

EXAMPLE 16

The process of Example 5 is repeated except that the Polyamine H is replaced (on a chemically equivalent basis) with N-amino ethyl piperazine.

EXAMPLE 17

The process of Example 5 is repeated except that the Polyamine H is replaced (on a chemically equivalent basis) with N-amino propyl morpholine.

EXAMPLE 18

The process of Example 5 is repeated except that the Polyamine H is replaced (on a chemically equivalent basis) with N-(3-amino propyl)octadecyl amine.

EXAMPLE 19

The process of Example 5 is repeated except that the Polyamine H is replaced (on a chemically equivalent basis) with decamethylene diamine.

The products prepared by the process illustrated above are, for the most part, viscous liquids or semi-solids. The principal utility of such products is as additives in hydrocarbon oil compositions. When added to a hydrocarbon oil the products are capable of imparting corrosion inhibiting and oxidation inhibiting properties to the oil. Furthermore, the products derived from hydrocarbon substituted dicarboxylic acids in which the hydrocarbon radical contains 50 or more aliphatic carbon atoms are capable of imparting detergent properties to the oil. The size of the hydrocarbon substituent in the succinic acid reactant is a critical feature in determining whether the product will have detergent properties.

The amounts of the products of this invention to be used in the hydrocarbon oil depend to a large measure upon the type of the hydrocarbon oil, the degree of improvement desired in the final composition and the nature of the service to which the final composition is to be subjected. The hydrocarbon oils which are benefited by the incorporation therein of the products of this invention include principally gasolines, burner fuel oils, metal working oils, cutting oils, and especially lubricating ois for use in internal combustion engines, gears and power transmitting units. Thus, for example, for use in fuel oils, the products of this invention are usually employed in amounts ranging from 0.001% to 2%, more often in the neighborhood of 0.005%–0.5%, by weight of the final composition. For use in lubricating oils the products of this invention are employed in amounts ranging from 0.1% to 5%, more often in the neighborhood of 0.5%–2%. In some instances as much as 10% or even more of the products of this invention may be employed in hydrocarbon oils such as lubricating compositions for marine diesel engines.

The effectiveness of the products of this invention as additives in fuel oils to inhibit the formation of sludge is shown by the results of the fuel oil Detergent Test (Table I). In this test a mixture of 4 liters of a catalytically cracked No. 2 light fuel oil and 15 grams of a synthetic sludge (prepared by homogenizing a 50/40/10, by weight, mixture of distilled water/fuel oil/carbon black) is circulated for 2 hours in a fuel oil burner pump (Model J3BC–100–3, manufactured by Sundstrand Machine Tool Co., Illinois) equipped with a 100-mesh Monel strainer. The sludge retained on the strainer is washed with acetone and weighed. The effectiveness of the additive is indicated by the percent reduction of the sludge retained on the strainer as compared to the sludge formed from the fuel oil containing no additive.

*Table 1*

| Composition | Sludge | |
|---|---|---|
| | Milligrams | Percent Reduction |
| Fuel oil | 500 | |
| Fuel oil containing 25 pounds per 1000 barrels of the product of Example 1 | 8 | 98 |

The effectiveness of the products of this invention as additives to impart detergent properties to lubricating oils is shown by the results (Table II of the following test):

A 350-ml. sample of a mineral oil having a viscosity of about 200 Saybolt Universal Seconds at 100° F. containing 0.001% of iron naphthenate and 1.5% by weight of the additive to be tested is heated at 300° F. for a specified period in a 2 x 15 inch borosilicate tube. A 1.5 x 6 inch SAE 10–20 steel panel is immersed in the oil. Air is bubbled through the oil at a rate of 10 liters per hour. The oxidized sample is allowed to cool to 122° F. whereupon 0.5% (by volume) of water is added and dispersed through the sample. The sample is allowed to stand for 16 hours at room temperature and then filtered through dry number 1 Whatman paper (double thickness) under slightly reduced pressure. The precipitant is washed with naphtha to constant weight and reported as milligrams of sludge per 100 cc. of oil. The steel panel is rated on a scale of 10 (no deposit on the surface) to 0 (deposit throughout the surface). The amount of sludge formed and the appearance of the steel panel are taken as indications of the detergent properties of the oil. The test may be adapted to measure also the corrosive tendency of the oil by immersing a copper-lead bearing in the oil during the air-blowing step and measuring the weight loss of the bearing at the end of the test.

Table II

| Composition | Test Duration (Hours) | Sludge (milligrams/ 100 cc. Oil) | Steel Panel Rating | Bearing Weight Loss, Milligrams |
|---|---|---|---|---|
| Lubricating oil | 96 | 900–1,200 | 1.0 | |
| Do | 48 | 175–400 | 1.0 | |
| Do | ¹48 | 850–1,300 | 1–2 | 36–51 |
| Lubricating oil plus product prepared according to Example 1 | 96 | 1.5 | 9.0 | |
| | ¹48 | 1.7 | 10.0 | 0.6 |
| Lubricating oil plus product prepared according to Example 2 | 96 | 12.7 | 9.0 | |
| | ¹48 | 2.2 | 9.0 | 5.6 |
| Lubricating oil plus product prepared according to Example 3 | 96 | 17.2 | 3.5 | |
| Lubricating oil plus product prepared according to Example 4 | 96 | 2.6 | 7.0 | |
| Lubricating oil plus product prepared according to Example 5 | 48 | 1.4 | 7.0 | |
| Lubricating oil plus product prepared according to Example 6 | ¹48 | 10.5 | 7.5 | 6.0 |

¹ Cu-Pb bearing used in the test.

Lubricants containing the products of this invention for use in gasoline internal combustion engines have also been evaluated by the CRC L-4-545 Engine Test. The test involves the operation of a 6-cylinder gasoline automobile engine for 36 hours under the following conditions: engine speed, 3,150 r.p.m.; engine load, 30 brake horsepower; jacket coolant temperatures, outlet 200° F., inlet 190° F.; oil sump temperature, 265° F.; air:fuel ratio, 14.5:1. The lubricant used in the engine is rated according to the weight loss of the bearing and the cleanliness of the pistons and the overall varnish and sludge deposits on the various parts of the engine. By this test a lubricant containing 1.3% by weight of the products prepared according to Example 8 gives a piston cleanliness rating of 9.4 (10 being perfectly clean) and an overall varnish and sludge rating of 96.7 (100 being perfectly clean).

The efficacy of the products of this invention as additives in lubricating compositions for automatic transmissions is shown by the Powerglide test (CRC Designation L-39). The test consists of operating a 1955 Chevrolet Powerglide Transmission for 300 hours under the following conditions: transmission sump temperature, 275° F.; governor pressure, 55–70 p.s.i.; main line pressure, 85–95 p.s.i.; transmission speed, 1,700–1,800 r.p.m. This test is regarded in the industry as an important means for evaluating lubricating compositions for use in automatic transmissions. The lubricant is evaluated in terms of (1) the weight loss of the cindered bronze thrust washer due to corrosion, (2) the amounts of varnish and sludge formed on the clutch plates (expressed in terms of a numerical rating from 10, representing no varnish or sludge, to 0, representing maximum varnish or sludge), and (3) the amounts of the overall varnish and sludge formed in the transmission (expressed as a numerical rating from 50, representing no varnish or sludge, to 0, representing maximum amounts of sludge or varnish).

A lubricating composition containing 1.5% by weight of the product prepared according to Example 9 is found to pass this test with the following results: thrust washer weight loss, 0.2%; plate varnish rating, 10.0; plate sludge rating, 10.0; overall varnish rating, 50; and overall sludge rating, 50.

The efficacy of lubricating compositions containing the products of this invention under conditions of high speed and high temperature in a diesel engine is shown by the results of a modified version of the Caterpillar CRC-L-1 test (U.S. Army Ordnance tentative specifications AXS-1551). The modification consists of the use of a fuel having a sulfur content of 1% (significantly higher than that of the specified fuel). In this test the lubricating composition is used in the crankcase of a 4-stroke diesel engine having a 5¾" x 8" stroke and a compression ratio of 15 to 1, operated for 120 hours under the following conditions: speed, 100 r.p.m.; B.t.u. input per minute, 2,900–3,000; load, 20 brake horsepower; water jacket outlet temperature, 175°–180° F.; oil temperature, 145–150° F. The lubricating composition is evaluated in terms of (1) the piston cleanliness expressed as a numerical rating of 0–100, 100 being perfectly clean and 0 representing maximum deposit and (2) percent ring filling. A lubricating composition containing 0.57% by weight of the product prepared according to Example 3 is found to pass this test with the following results: ring filling of 1% and a piston cleanliness of 97.

This invention contemplates also the use of other additives in lubricating compositions containing the products prepared by the process described herein. Such additives include, for example, detergents for both ash-containing and ashless types, extreme pressure addition agents, rust inhibiting agents, viscosity index improving agents, pour point depressing agents, anti-foam agents and supplemental oxidation and corrosion inhibiting agents. A particular effective combination of additives for use in lubricating oils for internal combustion engines, gears and power transmitting units comprising the products prepared by the process of this invention and an ash-containing detergent. The detergent may be either a neutral salt or a basic salt of alkali or alkaline earth metals with oil-soluble sulfonic acids, carboxylic acids or organic phosphorus acids such as phosphosulfurized hydrocarbons prepared by the reaction of an olefin polymer with a phosphorus sulfide. The basic salts of alkaline earth metals with sulfonic acid or organic phosphorus acid derived from the olefin polymers having molecular weight above about 500, preferably up to 5,000 or 100,000, are especially effective for use in such lubricating compositions. The term "basic salts" designates the metal salts in which the metal is present in stoichiometrically larger amounts than the organic acid radical.

A commonly used method for preparing the basic metal salt involves heating an oil-soluble acid with a stoichiometric excess of a metal neutralizing agent such as the metal oxide, metal hydroxide, metal carbonate, metal sulfide, or the like and filtering the resulting mixture in a diluent such as mineral oil to produce a fluid product. The use of a "promoter" compound in neutralization step is likewise well known in the art. The compounds useful as the promoter include phenolic compounds such as phenol, naphthol, alkylphenols, and alkyl naphthols; alcohols such as methyl alcohol, butyl alcohol, ethylene glycol, Cellosolve, carbitol, decyl alcohol, and oleyl alcohol; amines such as aniline, phenyl-beta-naphthyl amine, phenothiazine, and phenylenediamine. A particularly effective method for preparing the basic salt comprises carbonating a mixture of an oil-soluble acid, e.g., mahogany acid, with a stoichiometric excess of an alkaline earth metal neutralizing agent in the presence of a phenolic promoter or an alcohol promoter at a temperature above about 50° C., preferably between 80° C. and 200° C. The following examples illustrate the method by which basic salts may be prepared.

EXAMPLE A

A mixture of 590 parts of a mineral oil, 110 parts of water, 61 parts of heptylphenol, 340 parts of barium mahogany sulfonate, and 227 parts of barium oxide is heated at 100° C. for 0.5 hour and then to 150° C. Carbon dioxide is then bubbled into the mixture until the mixture is substantially neutral. The mixture is filtered and the filtrate found to have a sulfate ash content of 25%.

EXAMPLE B

A polyisobutene having a molecular weight of 50,000 is mixed with 10% by weight of phosphorus pentasulfide at 200° C. for 6 hours. The resulting product is hydrolized by treatment with steam at 160° C. to produce an acidic intermediate. The acidic intermediate is then converted to a basic salt by mixing with 2 moles of barium hydroxide and 0.7 mole of phenol and carbonating the mixture at 150° C. to produce a fluid product.

EXAMPLE C

A basic barium mahogany sulfonate is prepared by mixing 900 parts by weight of a 40% mineral oil solution of a neutral barium mahogany sulfonate, 100 parts of water and 89 parts of barium oxide at 77° C., heating the mixture to 140° C. and then carbonating at 140°–150° C. until the mixture is substantially neutral to phenolphthalein. The product is then dried by heating it at 140°–150° C. and filtered. The filtrate is diluted with mineral oil to a 36% oil solution of the basic sulfonate having a barium sulfate ash content of 20% and a sulfur content of 2.5%.

EXAMPLE D

A mixture of 423 grams (1 equivalent) of sperm oil, 123 grams of (0.602 equivalent) of heptylphenol, 1214 grams of mineral oil and 452 grams of water is treated at 70° C. with 612 grams (8 equivalents) of barium oxide. The mixture is stirred at the reflux temperature for 1 hour and then at 150° C. while carbon dioxide is bubbled into the mixture beneath its surface. The carbonated product is filtered and the filtrate has a sulfate ash content of 35%.

EXAMPLE E

A concentrate of a carbonated, basic calcium sulfonate is prepared by introducing carbon dioxide to a mixture of 700 grams (0.5 equivalent) of a 40% oil solution of neutral calcium bright stock sulfonate having a molecular weight of 1,100, 900 grams of mineral oil, 296 grams (8 equivalents) of calcium hydroxide, 100 grams of methyl alcohol, 75 grams of iso-octyl alcohol, 2.5 grams of calcium chloride, and 2.5 grams of water. The carbonation is continued at 50°–58° C. until the mixture has a base number of 43 (phenolphthalein indicator). The mixture is then heated at 150° C. to distill off all volatile components. The residue is filtered and the filtrate has a calcium sulfate ash content of 19.7% and a metal ratio of 10.7.

EXAMPLE F

A concentrate of a carbonated, basic metal salt is prepared by the procedure substantially the same as is described in Example E except that the ratio of equivalents of calcium hydroxide to the neutral calcium bright stock sulfonate used is 15.5:1 and that the calcium hydroxide is added to the reaction mixture in 4 increments, each increment being followed by a carbonation step. The filtered product has a calcium sulfate ash content of 27% and a metal ratio of 16.

In lieu of the acids illustrated in the above examples other acids which may be used include oil-soluble sulfonic acids prepared by sulfonating mono- or poly-alkylated aromatic hydrocarbons such as di-dodecyl benzene, with sulfuric acid, sulfur trioxide, chlorosulfonic acid, oleum, etc.: phosphorized hydrocarbons or organic phosphorus acids prepared by the reaction of an olefin polymer with phosphorus trichloride and sulfur, phosphorothioic chloride, phosphorus heptasulfide, white phosphorus and sulfur halide, etc. In lieu of the barium neutralizing agent illustrated in the above examples, other alkaline earth metal neutralizing agents useful herein are illustrated by magnesium hydroxide, calcium oxide, calcium hydride, barium methylate, strontium hydroxide, or the like. When used with the products of this invention in lubricating compositions, the ash-containing detergents are usually present in amounts to impart from about 0.1% to 10% by weight of sulfate ash to the composition.

The extreme pressure addition agents useful in lubricating compositions containing products of this invention are illustrated by halogenated hydrocarbons such as chlorinated wax; organic sulfides and polysulfides such as dibutyl tetrasulfide, benzyl disulfide, di-(chlorobenzyl) disulfide, sulfurized methyl oleate, sulfurized sperm oil, sulfurized lard oil, sulfurized dipentene and sulfurized turpentine; phosphosulfurized hydrocarbons such as the reaction product of phosphorus sulfide with turpentine, dipentene, sperm oil, lard oil, or methyl oleate. Corrosion and oxidation inhibiting agents are exemplified by Group II metal dialkyl phosphorodithioates, Group II metal dialkaryl phosphorodithioates, Group II metal dialkyl- or dialkaryl-phosphinodithioates, metal dialkyl carbamates, metal salts of sulfurized alkyl-phenols, organic phosphorus acid esters such as di- or tri-hydrocarbyl phosphites, anthranilic acid and alkyl esters thereof, etc. The metals of these metal salts may be zinc, barium, cadmium, calcium or strontium. The organic portion of these additives preferably contain up to about 30 aliphatic carbon atoms. Specific examples of such inhibitors include: zinc dioctyl phosphorodithioate, zinc butyl-cyclohexyl phosphorodithioate, barium dinonyl phosphorodithioate, zinc diheptylphenyl phosphorodithioate, zinc dioctyl carbamate, barium salt of bis(hydroxylphenyl) sulfide, calcium salt of bis(hydroxylphenyl) methane, dioctyl phosphite, didodecyl phosphite, tricresyl phosphite, etc. The extreme pressure agents and the inhibitors are usually present in lubricating compositions in amounts within the range from about 0.05% to 5% by weight.

The following examples illustrate the use of the products of this invention with other additives in lubricating compositions. These lubricating compositions are adapted especially for use as lubricants for internal combustion engines, gears, and/or power transmitting units including especially automatic transmissions for passenger automobiles (all parts are by weight).

| Lubricating composition I: | Parts |
|---|---|
| SAE 20 mineral oil | 100 |
| Product of Example 1 | 0.2 |
| Barium detergent of Example A | 5 |

| Lubricating composition II: | Parts |
|---|---|
| SAE 10W–30 mineral oil | 100 |
| Product of Example 9 | 1 |
| Barium detergent of Example B | 3 |

| Lubricating composition III: | Parts |
|---|---|
| SAE 30 mineral oil | 100 |
| Product of Example 8 | 1.5 |
| Sulfurized sperm oil having a sulfur content of 10% | 2 |

| Lubricating composition IV: | Parts |
|---|---|
| SAE 50 mineral oil | 100 |
| Product of Example 6 | 0.15 |
| Barium detergent of Example A | 7.5 |
| Didodecyl phosphite | 0.2 |
| Poly(alkyl siloxane) anti-foam agent | 0.2 |

| Lubricating composition V: | Parts |
|---|---|
| SAE 5W–10 mineral oil | 100 |
| Product of Example 9 | 2 |
| Calcium mahogany sulfonate | 2.5 |
| Zinc di-cyclohexyl phosphorodithioate | 0.75 |

| Lubricating composition VI: | Parts |
|---|---|
| SAE 10W–30 mineral oil | 100 |
| Product of Example 2 | 0.5 |
| Neutral barium salt of an acidic composition prepared by the reaction of polyisobutene having a molecular weight of 1000 with $PCl_3$ and sulfur | 10 |

| Lubricating composition VII: | Parts |
|---|---|
| SAE 90W mineral oil | 100 |
| Product of Example 4 | 3 |
| Chlorinated eicosane having a chlorine content of 40% | 5 |
| Dibutyl tetrasulfide | 2 |
| Reaction product of $P_4S_7$ with methyl oleate | 2.5 |
| Zinc dihexylphenyl phosphorodithioate | 1 |

| Lubricating composition VIII: | Parts |
|---|---|
| SAE 10W–30 mineral oil | 86 |
| Product of Example 9 | 3 |
| Barium detergent of Example C | 1 |
| Barium detergent of Example B | 6 |
| Polymeric octylacrylate viscosity index improving agent | 0.5 |

| Lubricating composition IX: | Parts |
|---|---|
| SAE 10W–30 mineral oil | 90 |
| Product of Example 9 | 6 |
| Copolymeric aminoethyl acrylate-dodecyl acrylate viscosity index improving agent | 4 |
| Barium detergent of Example D | 1 |
| Anthranilic acid | 0.05 |
| Poly(alkyl siloxane) anti-foam agent | 0.02 |

| Lubricant composition X: | Parts |
|---|---|
| SAE 10W–30 mineral oil | 85 |
| Product of Example 9 | 3 |
| Zinc salt of di(hexylphenyl)phosphinodithioic acid | 0.1 |
| Copolymeric dodecyl acrylate-n-vinyl pyrrolidone viscosity index improving agent | 0.5 |
| Anthranilic acid | 0.02 |

What is claimed is:

1. A lubricating composition comprising a major proportion of a mineral lubricating oil and a minor proportion of a sulfur- and nitrogen-containing composition prepared by the process which comprises reacting, at a temperature above about 80° C., 1.0 mole of an alkylene amine having up to about 8 carbon atoms in the alkylene radical with at least about 0.5 equivalent of carbon disulfide and at least about 1 equivalent of a hydrocarbon-substituted aliphatic dicarboxylic acid compound selected from the class consisting of acid or anhydride having at least about 12 aliphatic carbon atoms in the hydrocarbon radical, and removing the water formed by the reaction.

2. The lubricating composition of claim 1 characterized further in that the alkylene amine is an ethylene amine.

3. The lubricating composition of claim 1 characterized further in that the hydrocarbon-substituted aliphatic dicarboxylic acid compound is a hydrocarbon-substituted succinic acid.

4. The lubricating composition of claim 1 characterized further in that the hydrocarbon-substituted aliphatic dicarboxylic acid compound is a hydrocarbon-substituted succinic acid anhydride wherein the hydrocarbon radical is derived from a substantially aliphatic olefin polymer.

5. The lubricating composition of claim 1 characterized further in that the hydrocarbon-substituted aliphatic dicarboxylic acid compound is a hydrocarbon-substituted succinic acid anhydride wherein the hydrocarbon radical is derived from a substantially aliphatic polymer of isobutene having a molecular weight within the range of 150 to 2,000.

6. The lubricating composition of claim 1 characterized further in that the ratio of equivalents of the carbon disulfide used to the hydrocarbon-substituted aliphatic dicarboxylic acid compound used is between 1:3 to 3:1.

7. A lubricating composition comprising a major proportion of a mineral lubricating oil and a minor proportion of a sulfur- and nitrogen-containing composition prepared by the process comprising acylating, at a temperature above about 80° C., 1.0 mole of an alkylene amine having up to about 8 carbon atoms in the alkylene radical with at least about 1 equivalent of a hydrocarbon-substituted aliphatic dicarboxylic acid compound selected from the class consisting of acid or anhydride having at least about 12 aliphatic carbon atoms in the hydrocarbon radical, removing the water formed thereby and reacting the acylated amine with at least about 0.5 equivalent of carbon disulfide.

8. The lubricating composition of claim 7 characterized further in that the step of reacting the acylated amine with carbon disulfide is carried out at a temperature above about 25° C. and below about 70° C.

9. The lubricating composition of claim 7 characterized further in that the step of reacting the acylated amine with carbon disulfide is carried out at a temperature above about 70° C.

10. The lubricating composition of claim 7 characterized further in that the alkylene amine is an ethylene amine.

11. The lubricating composition of claim 10 characterized further in that the ethylene amine is a mixture of ethylene amines having an average composition corresponding to that of tetraethylene pentamine.

12. The lubricating composition of claim 10 characterized further in that the ethylene amine is diethylene triamine.

13. A lubricating composition comprising a major proportion of a mineral lubricating oil and a minor proportion of a sulfur- and nitrogen-containing composition prepared by the process which comprises acylating, at a temperature above about 100° C., 1.0 mole of an ethylene amine with at least about 1.0 equivalent of a hydrocarbon-substituted succinic acid anhydride wherein the hydrocarbon radical is derived from a substantially aliphatic polymer of a lower mono-olefin having a molecular weight above about 700, removing the water formed thereby and reacting the acylated amine with at least about 1 equivalent of carbon disulfide at a temperature above about 25° C.

14. The lubricating composition of claim 13 characterized further in that the hydrocarbon-substituted succinic acid anhydride is a polyisobutene-substituted succinic acid anhydride wherein the polyisobutene radical has a molecular weight of about 1,000.

15. A lubricating composition comprising a major proportion of a mineral lubricating oil and a minor proportion of a sulfur- and nitrogen-containing composition prepared by the process which comprises acylating, at a temperature above about 100° C., 1.0 mole of an ethylene amine with at least about 1.0 equivalent of a hydrocarbon-substituted succinic acid anhydride wherein the hydrocarbon radical is derived from a substantially aliphatic polymer of a lower mono-olefin having a molecular weight above about 700, removing the water formed thereby and reacting the acylated amine with at least about 1 equivalent of carbon disulfide at a temperature above about 25° C., the combined equivalents of said dicarboxylic acid and said carbon disulfide being approximately equal to the number of equivalents of ethylene amine.

16. A lubricating composition comprising a major proportion of a mineral lubricating oil and a minor proportion of each of a sulfur- and nitrogen-containing composition prepared by the process which comprises reacting, at a temperature above about 80° C., 1.0 mole of an alkylene amine having up to about 8 carbon atoms in the alkylene radical with at least about 0.5 equivalent of carbon disulfide and at least about 1 equivalent of a hydrocarbon-substituted aliphatic dicarboxylic acid compound selected from the class consisting of acid or anhydride having at least about 12 aliphatic carbon atoms in the hydrocarbon radical, and removing the water formed by the reaction; and an oil soluble detergent selected from the class consisting of alkaline earth metal salts of a phosphosulfurized hydrocarbon, alkaline earth metal salts of a fatty acid, and alkaline earth metal sulfonates.

17. A lubricating composition comprising a major proportion of a mineral lubricating oil and a minor proportion of each of a sulfur- and nitrogen-containing composition prepared by the process which comprises reacting, at a temperature above about 80° C., 1.0 mole of an alkylene amine having up to about 8 carbon atoms in the alkylene radical with at least about 0.5 equivalent of carbon disulfide and at least about 1 equivalent of a hydrocarbon-substituted aliphatic dicarboxylic acid compound selected from the class consisting of acid or anhydride having at least about 12 aliphatic carbon atoms in the hydrocarbon radical, and removing the water formed by the reaction; and an oil-soluble inhibitor selected from the class consisting of dialkyl phosphites and Group II metal phosphorodithioates.

References Cited by the Examiner

UNITED STATES PATENTS

| | | | |
|---|---|---|---|
| 688,885 | 12/1901 | Ris | 260—132 |
| 1,981,055 | 11/1934 | Linster et al. | 260—135 |
| 2,220,851 | 11/1940 | Schreiber | 252—49.8 |
| 2,278,762 | 4/1942 | Bergen | 252—47.5 |
| 2,317,751 | 4/1943 | Frolich | 252—47.5 |
| 2,895,913 | 7/1959 | Carlyle et al. | 252—32.7 |
| 2,964,474 | 12/1960 | Alford | 252—32.7 |
| 3,018,247 | 1/1962 | Anderson | 252—32.7 |

DANIEL E. WYMAN, *Primary Examiner.*

L. G. XIARHOS, *Assistant Examiner.*